(No Model.)
A. VILE.
GAGE GLASS MOUNTING.
No. 604,441. Patented May 24, 1898.
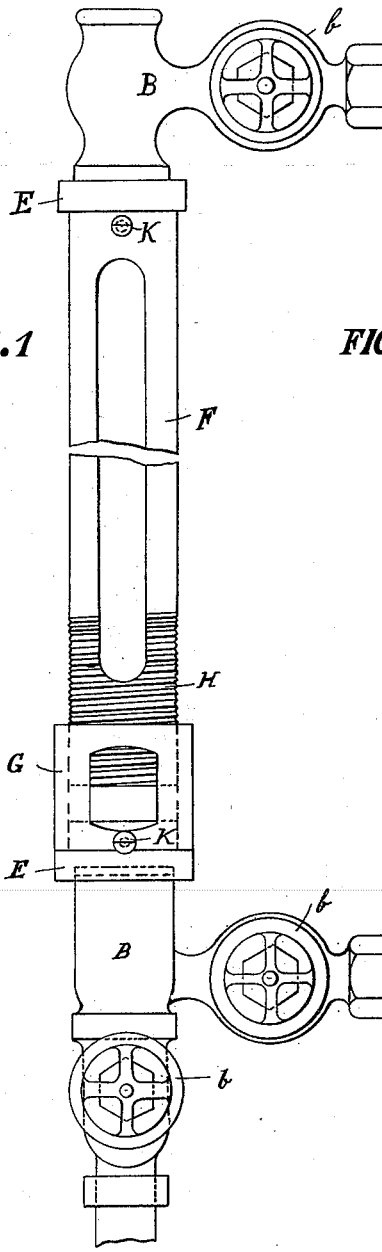
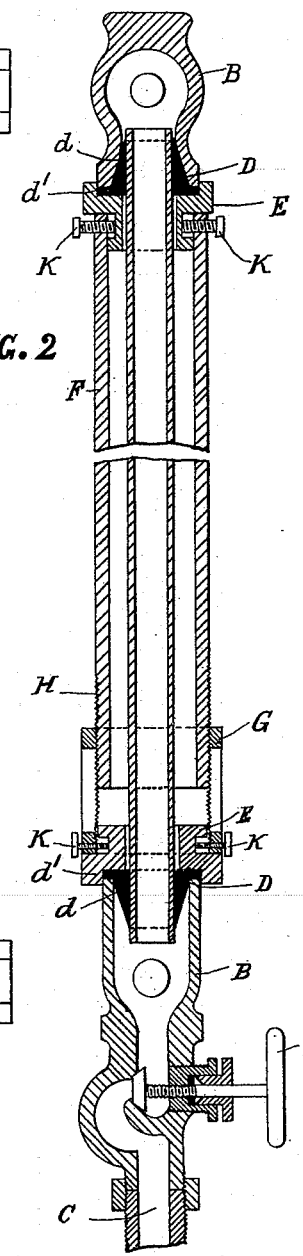

UNITED STATES PATENT OFFICE.

ALBION VILE, OF CARDIFF, ENGLAND.

GAGE-GLASS MOUNTING.

SPECIFICATION forming part of Letters Patent No. 604,441, dated May 24, 1898.

Application filed December 21, 1897. Serial No. 662,888. (No model.)

*To all whom it may concern:*

Be it known that I, ALBION VILE, residing at Cardiff, in the county of Glamorgan, England, have invented an Improvement in Gage-Glass Mountings, of which the following is a specification.

This invention relates to the mounting of gage-glasses under pressure, such as are used upon boilers, and is designed to effect such a joint between the gage-glass and the mountings and a rigid extension-joint between the mountings themselves that under no circumstances of variable internal pressure upon the mountings and gage-glass, as in blowing off, nor in ordinary use shall there be direct end or high lateral pressure upon the gage-glass, and, further, by a metallic extension-piece surrounding the gage-glass in direct metallic continuity with the mountings a high and more uniform temperature shall be maintained outside the gage-glass, thus obviating the common risk of fracture to the gage-glass during work or while blowing off; and in order that my invention may be the better understood I now proceed to describe the same, with reference to the drawings annexed hereto and to the letters marked thereon.

Figure 1 is an external side elevation of my improved gage-glass mountings. Fig. 2 is a front sectional view showing details of gage-glass joints.

A is the ordinary gage-glass, suitable for carrying a large internal pressure. The mountings B B are of the usual construction, having the usual valves or cocks $b$ $b$ and a waste-pipe C on the lower mounting for blowing through the gage-glass.

The joints about the ends of the gage-glass are similar for each end and consist of a cupped or hat washer D, of a suitable elastic material which will stand the pressure of high-pressure steam, such as woodite. The edges $d$ of the cup or hat washer fitting the gage-glass are brought to a knife-edge, so that the steam or other internal pressure will itself make a sliding steam and water tight joint upon the gage-glass. The flanges $d'$ of the washer come home upon the turned edges of the mountings. The flanges of the said washers are pressed home upon the mountings B B through intermediate covering-washers E E by the extension of a slotted metallic extension-piece F and a screwed nut or bush G, which engages with a screw-thread H on the said extension-piece F.

The nut or bush G is provided with bars or projections or other devices to enable the said nut or bush to be easily turned by the hand, thus avoiding the use of any special spanner or tool to screw up or to disengage the gage-glass.

It is obvious that when the nut G is turned so as to thrust apart the washers E a firm steam-tight joint is made upon the flanges $d'$ of the cup-pieces D directly upon the faces of the fixed mountings B, and this without any strain whatever upon the gage-glass A itself, the cup ends $d$ of the washers D making automatically a sliding steam-tight joint upon the gage-glass. One end of the extension-piece and the nut G are revolubly connected with their respective washers E by set-screws K, working in circumferential grooves.

When it is desired to blow out the gage-glass and the internal pressure is relieved both from the gage-glass and the mountings, it is obvious that there will be a tendency for the mountings, which have been kept apart by internal pressure, to close sharply together and upon the gage-glass in such cases where the gage-glasses directly bed upon the mountings. In my improved device such closing of the mountings, when internal pressure is removed, is resisted by the rigid metallic extension-piece F and the glass is preserved from any sudden strain or change of stress. As also the tubular extension-piece F is metallically in contact with the heated mountings, it will itself become equally warm and will tend to maintain an equality of temperature outside and about the gage-glass as exists inside.

The extension-piece F is provided with various slots through which the gage-glass may be seen, and the interior of the extension-piece F may be glazed white or in colors to render the gage-glass and contents more easily observable, if desired. The extension-piece F may be fixed in any angular position, so that the slots therein are presented in any convenient direction for the observation of the gage-glass.

Having now described my invention, what

I claim, and desire to secure by Letters Patent, is—

In combination, the gage-glass, the fittings B, B, the hat washers about the ends of the gage-glass, the metallic washers E, E, about the gage-glass for forcing the base-flange of the hat washers against the fittings, and the extension-piece F between the washers with the piece G screw-threaded into connection with the extension-piece and connected with the lower washer by a swivel-joint, substantially as described.

In testimony whereof I have signed my name to this specification in the presence of two subscribing witnesses.

ALBION VILE.

Witnesses:
DANIEL DAVIES,
DAVID EVANS.